United States Patent [19]

Pohoreski

[11] Patent Number: 4,576,714
[45] Date of Patent: Mar. 18, 1986

[54] SYSTEM FOR THE CLARIFICATION OF SEWAGE AND OTHER LIQUID-CONTAINING WASTES

[75] Inventor: Anton P. Pohoreski, Saskatchewan, Canada

[73] Assignee: Continental Manufacturing and Sales Inc., Saskatchewan, Canada

[21] Appl. No.: 621,236

[22] Filed: Jun. 15, 1984

[30] Foreign Application Priority Data

Feb. 3, 1984 [CA] Canada ................................ 446760

[51] Int. Cl.$^4$ ............................................. C02F 1/52
[52] U.S. Cl. .................................. 210/195.1; 210/199; 210/202; 210/205; 210/512.1
[58] Field of Search .................... 210/195.1, 202, 205, 210/195.3, 199, 219, 512.1, 201

[56] References Cited

U.S. PATENT DOCUMENTS

| | | | |
|---|---|---|---|
| 3,434,968 | 3/1969 | Lowe | 210/202 X |
| 3,773,660 | 11/1973 | Hopwood | 210/195.3 X |
| 3,899,423 | 8/1975 | McGrath | 210/202 X |
| 4,141,832 | 2/1979 | Minbiole | 210/195.3 |
| 4,219,424 | 8/1980 | Tamura et al. | 210/201 |
| 4,274,970 | 6/1981 | Beitzel | 210/205 X |

*Primary Examiner*—Thomas Wyse
*Attorney, Agent, or Firm*—Birch, Stewart, Kolasch & Birch

[57] ABSTRACT

A novel sewage purification system is provided herein. The system includes a pump for drawing sewage into the system and an injection inlet for injecting chemical into the effluent line from the pump. The pump leads to a pair of interconnected U-shaped mixing chambers connected to the effluent line from the pump, the U-shaped mixing chambers being baffled and being of a particular construction. There is also a recycle line from the inlet line to the mixing chambers back to the pump for recycling about 1–20% of the total flow rate, which is generally about 5–40 gallons/minute through the system. The U-shaped mixing chambers are also provided with at least two injection inlets for injecting chemicals thereinto. A splitter chamber is connected to the outlet from the mixing chambers to provide a pair of parallel flow outlets therefrom. A separator chamber is connected to the parallel flow outlets, the separator chamber having structure therein for providing tangential flow along the inside walls and also for separating sludge therefrom and for withdrawing it from the bottom thereof, and for withdrawing clean water from the upper central core thereof. Finally, a sludge removal line is provided, along with a sludge recycle line for recycling about 1–20% of the sludge back to the pump inlet line.

14 Claims, 2 Drawing Figures

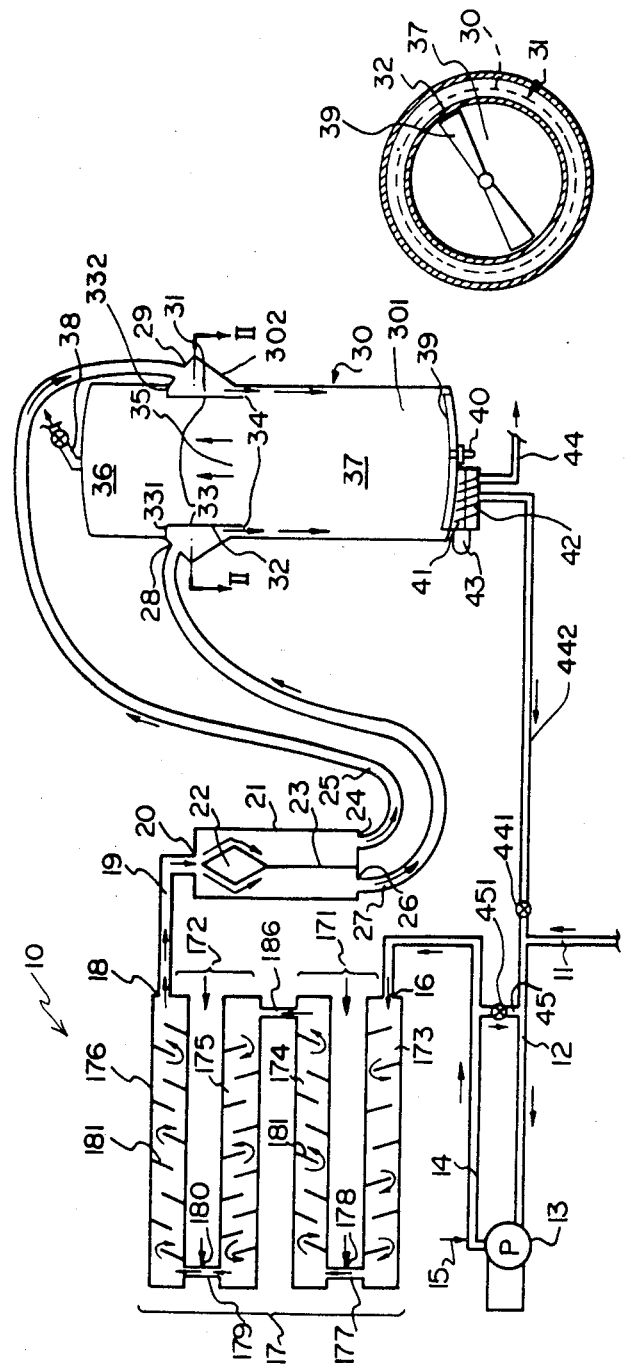

SYSTEM FOR THE CLARIFICATION OF SEWAGE AND OTHER LIQUID-CONTAINING WASTES

BACKGROUND OF THE INVENTION (i) Field of the Invention

The present invention relates to water treatment, and more particularly to an improved water treatment system used to produce drinkable water from impure water.

(ii) Description of the Prior Art

Conventionally, sewage is first pretreated in lagoons to settle out solids and it then passes through first and second filtering tanks or the like which attempt to remove remaining solids. The effluent is then allowed to pass to the disposal outlets which may be rivers, streams or the like. Unfortunately, this effluent still contains a relatively large quantity of impurities, the method is time consuming and relatively large land areas are required for the lagoons.

A so-called "package water treatment plant" is appropriate for use in small community water systems, resort areas or construction and lumber camps located in remote areas. Such package water treatment plant which is easily maintained and operated by unskilled individuals is preferable over larger more complex systems requiring continuous maintenance and supervision. In particular, there is a definite need for packagetype water treatment plants which can accommodate flows from about 300 to 6000 gallons per hour and can operate on a continuous daily basis. The size of a package water treatment plant is important, and it is desirable to provide a plant which may be readily moved from one area to another depending upon needs.

It is also well known in the art that the addition of certain chemicals, such as lime and soda ash, to water having undesirable solids dissolved therein has the effect of causing the dissolved solids to precipitate and form a suspension or slurry with the water. It is further known that to add raw water and chemicals to a slurry formed as above results in improved and accelerated coagulation and purification of the water. The solids which precipitate from the raw water tend to deposit by accretion on the particles present in the slurry, forming relatively stable particles which are readily separable from the clear, purified water.

It is also well-known that color, turbidity, organic matrer and similar impurities may be removed from water by coagulants, e.g. alum, ferric sulfate or the like. These compounds are acidic and react with the alkalinity in the water or with alkaline compounds, e.g. lime or soda ash, to form voluminous insoluble precipitates (hydrates). The precipitates have a tremendous surface area on which the dissolved or colloidally dispersed impurities are absorbed. The suspended impurities are surrounded by the gelatinous hydrates and become part of the precipitate.

To soften water by this process, lime (calcium hydroxide) is added to precipitate the calcium bicarbonate as calcium carbonate and the magnesium salts as magnesium hydroxide. Soda ash (sodium carbonate) is added to react with the calcium chloride and calcium sulfate originally present in the water as well as that formed by the reaction of lime with magnesium chloride and sulfate. The reaction of sodium carbonate with these salts forms calcium carbonate. Thus the hardness (calcium and magnesium salts) originally present in the water is partially removed as the slightly soluble compounds, calcium carbonate and magnesium hydroxide, precipitate.

Usually a coagulant, e.g. alum, sodium aluminate or ferric sulfate, is added in the treatment to assist in the separation of the turbidity and precipitates formed from the water. If the sterilization and reduction in organic mater are required, chlorine is also used in the treatment. By suitable modification in the chemical treatment, silica reduction can be obtained.

Domestic or sanitary sewage and industrial wastes may be purified by the chemical precipitation process, in which suitable chemicals (e.g. aluminum sulfate, lime, iron chloride, polyelectrolytes or combinations thereof) are added to the sewage and the sewage passed to one or more flocculating tanks, normally equipped with slowly rotating agitators or paddles, in which colloidal solids are formed into particles of size and weight that will settle. The colloidal solids or flocs are then separated from the liquid by being allowed to settle in subsequent settling tanks, whereafter the purified water is collected in a weir structure mounted at the surface of the water, while the sediment, consisting of flocs and sludge, is removed, normally by means of sludge scrapers and/or pumps. Certain industrial wastes or sewage has inherent flocculating tendencies, and thus it is unnecessary with such effluents to add flocculating chemicals since corresponding purifying effects can be obtained solely by agitating the liquid and allowing the resulting floc to settle.

Petersen, Canadian Pat. No. 517,674 issued Oct. 18, 1955 provides method and apparatus for the purification of water. The method for treating water to remove substances therefrom by chemical precipitation comprises contacting the water to be treated with partially clarified water and forming a mixture thereof. Chemicals are added to the mixture so formed and the mixture is passed into a reaction zone under sufficient pressure to cause agitation therein. A sufficient portion of the water displaced from the reaction zone into a primary clarification zone to give a flow rate of from 2 to 14 gallons per minute per square foot of cross-sectional area in the primary clarification zone, the incoming raw water is contacted therewith. The remaining water is displaced from the reaction zone into a secondary clarification zone wherein the precipitated solids settle out slowly. Treated, clarified water is then withdrawn from the secondary clarification zone.

The water treating apparatus includes a treating tank, an inner shell extending downwardly within the tank to a point near the base thereof and communicating at its bottom with the interior of the tank. The inner shell and the tank form an annular passage therebetween. The inner shell has an open-bottomed base portion of greater cross-sectional area than the upper portion thereof. Communicating means are provided between the base portion and the upper portion. A raw water inlet is provided in the upper portion of the inner shell. Means are so arranged as to withdraw water from the upper portion of the inner shell and to introduce such water into the base of the tank at a point immediately below the open bottom of the base portion of the inner shell. Means are provided for introducing chemicals into such water after withdrawal from the inner shell and prior to introduction into the tank. Agitation stilling means are mounted in the annular space between the base portion of the inner shell and the tank. Means are provided for removing solids precipitated from the treated water.

Finally, means are provided for removing clarified, treated water from the upper portion of the annular space between the inner shell and the tank.

A package water treatment plant is disclosed in Canadian Pat. No. 692,543 issued Aug. 11, 1964 to C. L. Oldfather. The water treatment plant includes a cylindrical shell disposed with a semicircular settling tank. The cylindrical shell incorporates a plurality of coagulation chambers arranged in continuous communication for eventual discharge of influent impure water into the settling tank. The settling tank discharges water therefrom into a filter which uses sand as the filtering media. After passing through the sand filter, the water is then transported to a storage tank.

Duff et al, Canadian Pat. No. 843,762 issued June 9, 1970 provides a water treating apparatus for softening of water by the cold lime-soda ash process and for the clarification of waters containing suspended solids, color and organic impurities by coagulation with alum or ferric sulfate or other coagulants. Coagulation and softening may be carried out simultaneously in this type of water treating apparatus. Such water treating apparatus has means forming a settling zone, means forming a mixing and recirculation zone and means forming an uptake zone. The uptake zone has a closed bottom member with an opening substantially in the center thereof through which the uptake zone communicates with the mixing and recirculation zone and the settling zone, and the upper portion of the intake zone communicates with the mixing and recirculation zone. The mixing and recirculation zone communicates with the settling zone. Means are provided to supply a chemical treating agent to the uptake zone to form precipitates therein. Means are provided to withdraw effluent from the settling zone. Feed means are provided to pass influent water into the uptake zone, those feed means to pass influent water into the uptake zone being located above the bottom member. These feed means are so constructed and arranged and are the sole means for causing the water in the uptake zone to rotate therein and to be pumped upwardly from the uptake zone and for recirculating precipitates entering the uptake zone from the settling zone through the opening in the bottom member thereof. Those feed means to pass influent water into the uptake zone are connected to a supply of influent water.

Miller, et al Canadian Pat. No. 853,022 issued Oct. 6, 1970 provides a hot process settling tank which includes a generally spherically shell. A partition divided the volume of the spherical shell into an upper reaction compartment and a lower settling compartment. An upwardly diverging baffle is disposed within the spherical shell forming the base surface of the settling compartment and defines the upflow zone of increasing cross-sectional area for gradually decreasing the rate of upflow to permit the formation of sludge blanket in the settling compartment. The baffle and spherical shell together form a generally annular space therebetween which may be used as a liquid storage. A vent is associated with the liquid storage to prevent the entrapment of air therein as the storage space fills with liquid.

Dunhers, Canadian Pat. No. 972,880 issued Aug. 12, 1975 provided a sewage flocculating and sedimentation tank unit for purifying domestic sewage and industrial waste, comprising a flocculating section and a sedimentation section having an outlet and a fluid connection therebetween. The flocculating section and sedimentation section and the connection therebetween are positioned so that the flow of sewage from the flocculating section to the sedimentation section outlet, as seen in plan view, is directed substantially perpendicular to the longitudinal direction of the tank and as seen in vertical section, obliquely upwards. Each of the flocculating section and the sedimentation section is divided into a plurality of aligned compartments by transversely extending guide walls for substantially uniformly distributing the sewage over the tank in the longitudinal direction thereof. Those plurality of aligned flocculating compartments extend the longitudinal length of the tank. The sedimentation compartments confront opposite sides of the flocculating section in fluid communication therewith.

Bultz, Canadian Pat. No. 951,035 issued July 9, 1974, provides a sewage and effluent treating system. The secondary sewage treatment apparatus includes means to add a flocculating chemical to the sewage. Means are provided to agitate the sewage and the chemical thoroughly to mix them. Means are provided to separate the flocculated material from the liquid effluent. Such means to agitate the sewage and the chemical includes an agitating module. The agitating module includes a casing, an intake header at one end of the casing, an outlet baffle chamber at the other end of the casing and a plurality of conduits in the casing communicating between the header and the baffle chamber. Each of the conduits include a plurality of baffles extending from their walls to agitate sewage passing therethrough. A substantially horizontal perforated partition baffle is provided which spans each of the conduits lengthwise and separates each conduit into a normal flow agitating portion above the partition baffle and a reverse flow cleaning portion below the partition baffle. The plurality of baffles are located in the normal flow agitating portion. An effluent-flow-operated flap valve is hinged on the discharge ends of each of the conduits for closing off the normal flow agitating portions when effluent is flowing in a direction opposite to the normal direction of flow, and for opening the normal flow agitating portion when the effluent is flowing in the normal direction of flow.

In U.S. Pat. No. 3,768,648, is disclosed a settler assembly which utilizes a plurality of inclined passages of chevron cross-section configuration. The chevron configuration provides a higher critical flow rate than passages having square, circular, hexagonal and the like cross-sectional configuration.

Swelberg, Canadian Pat. No. 1,074,928 issued Apr. 1, 1980 provides a package water treatment plant for producing drinkagle water from impure water. It incorporates a plurality of coagulation chambers in communication with a primary settling tank which in turn is in communication with a secondary settling tank. The secondary settling tank incorporates a plurality of inclined coextensively arranged chevron cross-sectional settling tubes which greatly increase the rate of sedimentation of the impure water for subsequent delivery to a third settling tank. The third settling tank incorporates a typical sand filter for removing or catching particles before the water is channeled into a storage tank. The storage tank is arranged to permit a bacteria killing source to be discharged into the stored water.

Another sewage treatment system is the so-called CANWEL system (a trade mark of Central Mortgage and Housing Corporation, Canada). The system consists of an absorption bio-oxidation (A-B) reactor, a sludge separator, a chemical reactor-clarifier, an ozone reactor, and an optional sludge thickener, depending upon the method proposed for sludge disposal.

The raw or comminuted domestic or general municipal (non-industrial) sewage enters the A-B reactor where, in the aeration chamber-air lift, it is contacted with activated sludge and distributed into the top layers of the reactor mixed liquor. The activated sludge consists of a mixed microbial population together with powdered activated carbon.

The sludge is kept in a downward oriented motion, maintained by withdrawing sludge from the bottom of the reactor and recycling it to the top via airlift. The organic matter present in sewage is primarily removed from the processed wastewater by adsorption on biological solids and activated carbon. Then, as the sludge solids move downward by gravity and by the downward flow of the mixed liquor, the adsorbed organics are bio-oxidized. Along the bio-oxidation of organics, the nitrifying bacteria present in mixed liquor suspended solids transform the ammonia to nitrite and nitrate. As a result of these bio-reactions, the concentration of the dissolved oxygen in the reactor liquor drops from about 1.5 mg/l at the top layers to near zero at the bottom layers. At this low level of dissolved oxygen, nitrite and nitrate replace oxygen as the final electron acceptor in the respiration chain, resulting in microbial denitrification. The mixed liquor then overflows via a submerged pipe into the sludge separator.

The mixed liquor withdrawn from the bottom of the A-B reactor overflows into the sludge separator where the solids are separator from the liquor by settling, and recycled back into the reactor.

The A-B reactor system is consistently "filled" with sludge, the yield, or excess, of which automatically overflows with the treated waste-water from the sludge separator into the chemical reactor-clarifier. Here, by the addition of a chemical coagulant, phosphorus and colloidal substances are precipitated, and then removed together with excess biological solids in a fluidized bed of chemical sludge.

The clarified effluent from the chemical reactor-clarifier is air-lifted into the central column of the ozone reactor where it is contacted with ozone in countercurrent fashion. Oxidation of residual organics then takes place in the main tank. At this point the effluent is suitable for final disposal and may be considered for undiluted surface discharge, discharge to storm systems or small streams and lakes, or for utility uses.

The excess chemical sludge together with the excess biological sludge continuously overflows into a sludge thickener, from where the thickened sludge is periodically withdrawn and disposed of by conventional or other means. The supernatant is returned to the A-B reactor.

The CANWEL system also includes a water polishing sub-system which consists of mixed media filtration, optional pH balance control, optional reverse osmosis (R.O.) and disinfection with ozone. The mixed media gravity filtration unit accepts raw water from an approved source and of a quality with potential for municipal and domestic use, and removes a high percentage of suspended solids. Where required, appropriate chemicals are added automatically in controlled amounts to maintain pH balance.

Where required, the R.O. process demineralizes the water by reducing to safe levels the incidence of dissolved salts. The process also deals effectively with colloidal solids (e.g., asbestos), bacteria, and dissolved organic materials. A concentrated brine with other rejects is accumulated for disposal.

The water flows into the ozone contact chamber for oxidation and destruction of any residual viral and bacterial organisms. This polished water is now suitable for all domestic purposes and will meet the requirements for municipal water.

(iii) Deficiencies of the Prior Art

In spite of the above described prior art, there is still a need for an improved sewage treatment system, method and apparatus to provide an effluent that meets the standards for human consumption out of sewage, in the shortest possible time. The effluent should be so pure that there would be no need for the cleaned effluent to pass through conventional first and second filtering tanks.

SUMMARY OF THE INVENTION (i) Aims of the Invention

Accordingly one broad object of this invention is the provision of an improved sewage treating which is simple and effective in providing potable water from raw sewage.

Another object of this invention is to provide an improved sewage treating process which is simple and effective in providing potable water from new sewage.

Yet another object of this invention is to provide an improved sewage separator chamber which is adapted to be used in the sewage treating system.

Yet another object of this invention is to provide such an improved sewage separator which is simple in construction and economical in manufacture.

(ii) Statements of Invention

This invention provides a sewage purification system comprising (a) a pump for drawing sewage into the system (b) an injection inlet for injecting a first chemical into the effluent line from the pump; (c) a first U-shaped mixing chamber, and a second, interconnected, U-shaped mixing chamber, each of the first and second mixing chambers comprising a near arm and a far arm, the first and second mixing chambers being connected to the effluent line from the pump, the inlet to the mixing chambers being to a near arm of a first mixing chamber, the outlet from the mixing chambers being from a far arm of a second mixing chamber, the mixing chambers being interconnected between the far arm of the first mixing chamber and the near arm of the second mixing chamber, each of the near arm and the far arm of the mixing chamber having baffles therein, the baffles extending only partly across the cross-section of the arm and alternating from one longitudinal face to the opposed longitudinal face and each being inclined at the same angle towards the direction of flow, to tend to cause turbulent flow, and a conduit interconnecting each near arm with each far arm, each conduit including an injection inlet for the injection thereinto of a respective second chemical and third chemical into the respective mixing chambers; (d) a splitter chamber connected to the common outlet from the mixing chambers to convert the single inflow into a pair of parallel flow outlets therefrom; (e) a separator chamber connected to the parallel flow outlets and having inlet structure to cause streams of the chemically-treated sewage to flow in a unitary direction longitudinally along the inside walls of the separator chamber, the separator chamber also having structure therein for separating sludge therefrom and withdrawing it from the bottom thereof through a sludge withdrawal line, and for withdrawing clean water from the upper central core thereof; and (f) a sludge recycle line interconnecting the separator chamber and the pump inlet line.

(iii) Other Features of the Invention

By one feature of the sewage purification system embodiment of this invention, the system includes a sludge holding hopper at the base of the separator chamber.

By another feature of the sewage purification system embodiment of this invention, the system includes a sludge sweeping member at the base of the separator chamber.

By yet another feature of the sewage purification system embodiment of this invention, the system includes a sludge withdrawal line from the holding hopper.

By still another feature of the sewage purification system embodiment of this invention, the system includes a valve to control the recycle flow of sludge from the separator to the pump.

By another feature of the sewage purification system embodiment of this invention, the system includes a valved connector line between the sewage inlet line and the pump effluent line to provide for recycle from the pump effluent line back to the pump.

By one feature of this invention, the inlets comprises bulbous side wall protrussions.

By another feature of this invention, the inlets feed a directing chamber defined by a double open ended cylinder having depending cylindrical walls and a protruding annular rim by which it is secured to the inside of the separator chamber.

By a further feature of this invention, the directing chamber provides a continuous downwardly directed outlet door, and a central upwardly directed part.

(iv) Generalized Description of the Invention

The raw sewage, according to one embodiment to be described herein, is pretreated to induce coagulation, by the sequential use of three different chemical agents, of solids therein, both before entering into, and while within, a mixing zone. These certain chemicals are sequentially mixed with the liquid, preferably through a plurality of injector nozzles. The chemically treated liquid, e.g., sewage, then eventually flows to the separator chamber in a manner to be described hereinafter.

In the particular embodiment to be described herein, the sewage to be clarified is first treated by being mixed sequentially with three different chemicals, which are injected into the mixing chamber. It is imperative that the chemicals and the quantities be used in proper sequence in order to effect the desired results. The chemicals used, the quantities and the sequence will depend upon design parameters and will be described in greater detail hereinafter. They co-act to form flocs, crystals and other solids from the dissolved constituents of the sewage being treated, and it is these solids which are to be removed by the separator chamber.

Once treated, the chemical reactions commence and the sludge is converted to a coagulated waste. As the treated effluent passes through the separator chamber, the reacted sludge settles and is removed in the manner to be described in greater detail hereinafter.

BRIEF DESCRIPTION OF THE DRAWINGS

In the accompanying drawings,

FIG. 1 is a schematic representation of the system, and method of sewage treatment of an embodiment of this invention; and FIG. 2 is a section through the line II—II of a separator chamber according to another embodiment of this invention.

DESCRIPTION OF PREFERRED EMBODIMENTS (i) Description of FIG. 1

The sewage treatment system 10 includes a raw sewage inflow line 11 leading to a main flow line 12 connected to the inflow of a pump 13. The outflow line 14 from the pump 13 is provided with an injection means 15 for the introduction of a precipitation chemical, e.g. alum thereinto.

As used herein, alum means a hydrated double sulfate of aluminum and univalent metals, e.g. K, Na, NH4; for example, $K_2SO_4.Al_2(SO_4)_3.24H_2O$; $(NH_4)_2.Al_2(SO_4)_3.24H_2O$; $KAl(SO_4)_2.12H_2O$; and $(NH_4)_2SO_4.Fe_2(SO_4)_3.24H_2O$. The alum-treated raw sewage enters at one inlet 16 of a mixing chamber 17 and exits at an outlet 18 to be conveyed via line 19 to the inlet 20 of a splitter chamber 21.

Mixing chamber 17 comprises two interconnected U-shaped chambers, namely a first U-shaped chamber 171 and a second U-shaped chamber 172. The inlet 16 is connected to the near arm 173 of the first U-shaped chamber 171, and the outlet 18 is connected to the far arm 176 of the second U-shaped chamber 172. The first U-shaped chamber 171 is connected to the second U-shaped chamber 172 by a connecting arm 176.

The near arm 173 of the first U-shaped chamber 171 is connected to the far arm 186 of the first U-shaped chamber 171 by means of a connecting conduit 177, which is provided with an injection means 178 for the injection of treating chemicals thereinto. Similarly the near arm 175 of the second U-shaped chamber 172 is connected to the far arm 176 of the U-shaped chamber 172 by means of a connecting conduit 179, which is in turn provided with an injection means 180 for the injection of treating chemicals thereinto. Each of the four arms 173, 174, 175, 176 is provided with a plurality of staggered baffles 181 inclined towards the direction of flow, to cause the chemically-treated sewage to follow a sinusoidal flow path and thus be thoroughly mixed.

The splitter chamber 21 is a generally cylindrical vessel including an internal diamond-shaped baffle 22 therein to split the chemically-treated sewage flow into two turbulent streams, separated by a vertical imperforate baffle wall 23, to flow out of first outlet 24 to first effluent line 25 and second outlet 26 to second effluent line 27. First effluent line 25 feed the chemically-treated sewage to first inlet 29 of a cylindrical separator chamber 30, while second effluent line 27 feed the chemically-treated sewage to a second, diametrically-opposed inlet 28 of the separator chamber 30.

(ii) Description of FIG. 2

Separator chamber 30 includes an annular intermediate, bulbous-walled directing chamber 31 which is fed by effluent lines 25, 27 and which is defined by a double open ended cylinder 32 having depending cylindrical walls 33 and a securing annular rim 331, by which cylinder 32 is secured to the inner wall 332. Cylinder 32 provides a continuous annular downwardly directed outlet port 34, and a central open upwardly directed port 35. Port 34 cause the chemically-treated sewage to flow downwardly in an annular flow adjacent the cylindrical side walls of the cylindrical chamber 30.

The chamber 30 is divided into an upper clean water holding chamber 36 and a lower precipitation chamber 37. Clean water flow, upwardly through central core of the chamber 30 passes through core port 35 into the upper clear water holding chamber 36, from whence it is withdrawn via central, valved outlet line 38.

The precipitation sludge falls to the bottom of precipitation zone 37 from whence it is scraped by sweep 39 rotatably driven by rotor 40 into a sludge hopper 42. The sludge is propelled from the sludge holding hopper 42 by auger 41 driven by motor 43 into a waste sludge line 44, and into a recycle line 44, valved at 441, leading to main flow line 12. Main flow line 12 is connected to outflow line 14 by pump recycle line 45, valved at 451.

OPERATION OF PREFERRED EMBODIMENTS

In use, the basic flow pattern is as follows. The raw sewage is drawn by pump 13 through lines 11 and 12 and is pumped to the mixing chamber 17. Before the raw sewage goes to the mixing chamber 17 it is mixed with recycle sludge in line 4, and a recycle mixing flow both to the pump 13 occurs through recycle line 45. The sludge recycle rate is about 1-20%, preferably about 5-7% of the total flow rate through the system, which varies from about 5-40 gallon/minute. Alum is added to the pump outflow line 14, in an amount of about 10-200, preferably about 20-50 ppm by weight.

In the mixing chambers 17, the chemicals are added to provide the chemically treated raw sewage. The chemicals are added, preferably continuously, but in the essential sequence as follows: First, added through nozzle 178 is the second essential chemical added, namely, a high cationic polyelectrolyte, preferably an acrylamide-based copolymer, typically that known by the Trade Marks HERCULOC 855, HERCULOC 849 or HERCULOC 848. Other polyelectrolytes which may be used with varying degrees of success include high molecular weight electrolytes of either natural origin (e.g. proteins or polysaccharides) or of synthetic origin (e.g. alkyl halide addition products of polyvinyl pyridime).

Next the third essential chemical added, namely an anionic surface active agent, preferably, a polyacrylamide base, e.g. that known by the Trade Mark DOW A 23. Other such polyacrylamide bases which may be used are those known by the Trade Marks DOW A 23P, DOW A 25 and DOW A 27.

The particular construction of the mixing chambers 17 causes intimate treatment of the raw sewage with all the chemicals.

An important variant in the method is that there is a recycle of pump effluent back to the pump through valve 45. The pump recycle rate is about 1-20%, preferably about 5-7% of the total flow rate through the system. The intimately mixed chemically treated sewage passes to the splitter chamber 21 and the spit flows go to the separation chamber 30. The sludge settles at the bottom and goes to sludge disposal via line 41, or in amounts of about 1-20%, to the sludge recycle line 44, while the clean potable water is withdrawn via outlet line 38.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:
1. A sewage purification system comprising:
(a) a pump for drawing sewage into said system;
(b) an injection inlet for injecting a first chemical into the effluent line from said pump; (c) a first U-shaped mixing chamber and a second interconnecting U-shaped mixing chamber, said first and second mixing chambers being connected to said effluent line from said pump, each of said first mixing chamber and said second mixing chamber comprising a near arm and a far arm, the inlet to said mixing chambers being to a near arm of a first said mixing chamber, the outlet from said mixing chambers being from a far arm of a second said mixing chamber, the mixing chambers being interconnected between the far arm of said first mixing chamber and the near arm of said second mixing chamber, each of said near arm and said far arm having baffles therein, said baffles extending only partly across the cross-section of said arm and alternating from one longitudinal face to the opposed longitudinal face and each being inclined at the same angle, towards the direction of flow, to tend to cause turbulent flow, and a conduit interconnecting each said near arm with each said far arm, each said conduit including an injection inlet for the injection thereinto of a respective second chemical and respective third chemical into said respective mixing chambers;
(d) a splitter chamber connected to the common outlet from said mixing chambers to convert said single flow into a pair of parallel flow outlets therefrom;
(e) a separator chamber connected to said parallel flow outlets and having inlet structure therein to cause streams of said chemicallytreated sewage to flow in a unitary direction tengentially along the side walls of said separator chamber, said separator chamber also including means therein for separating sludge therefrom and withdrawing it from the bottom thereof, through a sludge withdrawal line and for withdrawing clean water from the upper central core thereof; and
(f) a sludge recycle line interconnecting said separator chamber and said pump inlet line.

2. The sewage purification system of claim 1 including a sludge holding hopper at the base of said separator chamber.

3. The sewage purification system of claim 2 including a sludge withdrawal line from said holding hopper.

4. The sewage purification system of claim 2 wherein said sludge recycle line interconnects said sludge holding hopper to said pump inlet line.

5. The sewage purification system of claim 1 including a sludge sweeping member at the base of said separator chamber.

6. The sewage purification system of claim 1 including a valve to control the recycle flow of sludge from said separator to said pump.

7. The sewage purification system of claim 1 including a valved connector line between the sewage inlet line and the pump effluent line to provide for recycle from pump effluent line back to said pump.

8. The sewage purification system of claim 1 wherein said inlet structure comprises a pair of diametrically opposed inlets adjacent the upper regions of said separator chamber, said inlets each including a protrussion from the associated side wall of said separator chamber leading to an associated inner directing chamber having a downwardly directed outlet, thereby to direct outward flow annularly downwardly within said separator chamber.

9. The sewage purification system of claim 8 wherein sid inlets each comprise bulbous side wall protrusions.

10. The sewage purification system of claim 8 wherein said inlets feed a directing chamber defined by a cylinder, open ended at both ends, having depending cylindrical walls and a protruding annular rim by which it is secured to the inside of said separator chamber.

11. The sewage purification system of claim 10 wherein said directing chamber provides a continuous, downwardly-directed, outlet door, and a central, upwardly-directed port.

12. The sewage purification system of claim 8 wherein said means for withdrawing clean water from the upper central core of said separator chamber comprises a valved central outlet.

13. The sewage purification system of claim 1 wherein said means for separating sludge and withdrawing said sludge from the bottom of said separator chamber comprises:
- a holding hopper at the base of said separator chamber;
- a lower sweep mechanism to force sludge to a said hopper;
- means for removing waste sludge from said hopper; and
- means for withdrawing a predetermined amount of sludge from said hopper for recycling said withdrawn sludge.

14. The sewage purification system of claim 13 wherein said sludge recycle and sludge withdrawal is provided by an auger within said sludge holding hopper.

* * * * *